(12) United States Patent
Nagai et al.

(10) Patent No.: US 7,777,387 B2
(45) Date of Patent: Aug. 17, 2010

(54) LAMINATED CORE AND METHOD FOR MANUFACTURING THE SAME

(75) Inventors: Akira Nagai, Kitakyushu (JP); Iwao Myojin, Kitakyushu (JP); Akinori Hoshino, Kariya (JP); Masafumi Sakuma, Kariya (JP); Hiroyuki Yamamoto, Kariya (JP); Haruji Suzuki, Kariya (JP)

(73) Assignee: Mitsui High-Tec, Inc., Fukuoka (JP)

( * ) Notice: Subject to any disclaimer, the term of this patent is extended or adjusted under 35 U.S.C. 154(b) by 484 days.

(21) Appl. No.: 11/909,220

(22) PCT Filed: Apr. 27, 2007

(86) PCT No.: PCT/JP2007/059227

§ 371 (c)(1),
(2), (4) Date: Sep. 20, 2007

(87) PCT Pub. No.: WO2008/139531

PCT Pub. Date: Nov. 20, 2008

(65) Prior Publication Data

US 2010/0001612 A1  Jan. 7, 2010

(51) Int. Cl.
*H02K 1/18* (2006.01)
*H02K 1/14* (2006.01)

(52) U.S. Cl. .......... 310/216.043; 310/216.013; 310/216.041; 310/216.044; 29/596

(58) Field of Classification Search .......... 310/216.008, 310/216.009, 216.011, 216.13, 216.041, 310/216.043, 216.044, 216.048, 216.057, 310/216.063
See application file for complete search history.

(56) References Cited

U.S. PATENT DOCUMENTS 5,986,377 A * 11/1999 Yamada et al. ........ 310/216.013

(Continued)

FOREIGN PATENT DOCUMENTS

JP 57-075551 A 5/1982

(Continued)

OTHER PUBLICATIONS

Japanese Office Action dated May 26, 2009, issued in corresponding Japanese Patent Application No. 2005-331948.

(Continued)

*Primary Examiner*—Burton Mullins
(74) *Attorney, Agent, or Firm*—Westerman, Hattori, Daniels & Adrian, LLP

(57) ABSTRACT

A laminated core (10) and a method for manufacturing the same formed with multiple continuous segment core pieces (13) wound in a spiral form by bending connecting portions (12) mutually connecting the segment core pieces (13), the connecting portions (12) being formed in an outer peripheral area (11), while the connecting portions (12) of vertically adjacent layers being displaced in a circumferential direction with inner edges or outer edges of the segment core pieces (13) fitted, the laminated core comprising: a concave cutout (21) provided in a radial exterior of each connecting portion (12) to dispose a radially expanded portion (20) within an outer circle of the laminated core (10), the radially expanded portion (20) being formed with each connecting portion (12) expanding radially outward at the time of bending each connecting portion (12); an interior cutout (22) provided in a radial interior of each connecting portion (12) to define a bending position of each connecting portion (12); and a receptacle (16) provided in a radial exterior of each segment core piece (13) to receive an expanded part (15) formed in the thickness direction at the time of bending each connecting portion (12).

16 Claims, 5 Drawing Sheets

U.S. PATENT DOCUMENTS

| | | | |
|---|---|---|---|
| 6,630,766 B1 * | 10/2003 | Kirn et al. | 310/418 |
| 6,856,064 B2 * | 2/2005 | Masumoto et al. | 310/216.008 |
| 6,919,665 B2 * | 7/2005 | Murakami et al. | 310/216.043 |
| 2003/0127938 A1 | 7/2003 | Shen et al. | |

FOREIGN PATENT DOCUMENTS

| | | |
|---|---|---|
| JP | 63-153745 U | 10/1982 |
| JP | 01-264548 A | 10/1989 |
| JP | 8-196061 A | 7/1996 |
| JP | 09-191588 A | 7/1997 |
| JP | 9-308143 A | 11/1997 |
| JP | 11-262202 A | 9/1999 |
| JP | 11-289695 A | 10/1999 |
| JP | 2000-152526 A | 5/2000 |
| JP | 2000-184630 A | 6/2000 |
| JP | 2000-341889 A | 12/2000 |
| JP | 2001-224143 A | 8/2001 |
| JP | 2001-238379 A | 8/2001 |
| JP | 2001-268825 A | 9/2001 |
| JP | 2003-324870 A | 11/2003 |
| JP | 2004-505595 A | 2/2004 |
| JP | 2005-160170 A | 6/2005 |
| WO | 02-11270 A1 | 2/2002 |

OTHER PUBLICATIONS

International Search Report of PCT/JP2007/059277, date of mailing Jul. 31, 2007.

Decision of Refusal of Japanese Patent Application 2005-331948, mailing date of Jan. 19, 2010.

* cited by examiner

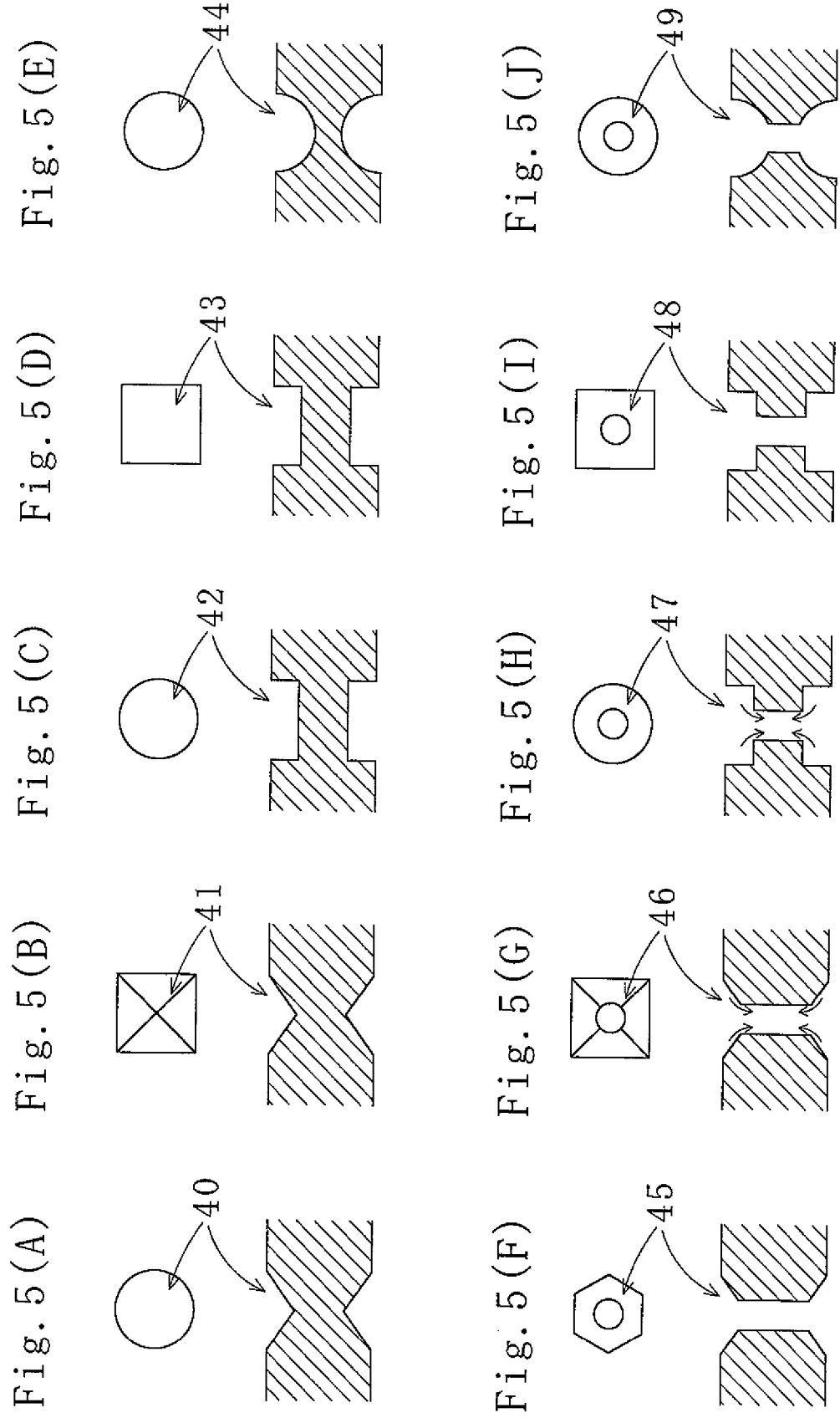

LAMINATED CORE AND METHOD FOR MANUFACTURING THE SAME

TECHNICAL FIELD

The present invention relates to a laminated core and a method for manufacturing the same, the laminated core being formed by spirally winding multiple continuous segment core pieces connected by connecting portions. The term "laminated core" used herein refers to stators and rotors used for motors and generators.

BACKGROUND ART

Conventionally, so-called wound cores have been known for improving yield of core materials used for producing laminated cores. The wound cores are produced by punching not ring-shaped core pieces, but a band of multiple segment core pieces from a magnetic steel strip, and winding and laminating the band of core pieces.

Specifically, as disclosed in, e.g., Japanese published unexamined publication No. 1-264548, Japanese published unexamined publication No. 8-196061, and Published Japanese translation of a PCT international application No. 2004-505595, arc-shaped segment core pieces are punched from a core material using molds, the segment core pieces having a prescribed number of slots and being connected with each other by connecting portions. Then, the connecting portions located in the outer peripheral area are bent, and the plural continuous core pieces are wound in a spiral form and laminated while inner circumferential portions of the adjacent core pieces are aligned.

However, in the conventional art disclosed in each of the publications, when the connecting portions are bent to position the multiple segment core pieces in an annular form, expanded parts are formed in the connecting portions in the thickness direction. The expanded parts create gaps between the laminated segment core pieces, thereby causing uneven thickness of manufactured laminated cores. In order to eliminate the gaps, for example, in the assembly of motors using the laminated cores, extra pressure treatments have been carried out on assembled laminated cores. However, it is difficult to remove the gaps completely even with the pressure treatments. Thus, the problems are that reduced efficiency and vibration in the motor using the laminated core are caused, thereby negatively affecting the quality of motors.

In view of the above circumstances, an object of the present invention is to provide a laminated core and a method for manufacturing the same, whereby high-efficient and high-quality products are manufactured without being affected by vertical expansion of the connecting portions.

DISCLOSURE OF INVENTION

To accomplish the above-mentioned object, the present invention provides a laminated core formed with multiple continuous segment core pieces wound in a spiral form by bending connecting portions mutually connecting the adjacent segment core pieces, the connecting portions being formed in an outer peripheral area of the laminated core, while the connecting portions of vertically adjacent layers being displaced in a circumferential direction with inner edges or outer edges of the segment core pieces fitted, the laminated core comprising:

a) a concave cutout provided in a radial exterior of each connecting portion to dispose a radially expanded portion within an outer circle of the laminated core, the radially expanded portion being formed with each connecting portion expanding radially outward at the time of bending each connecting portion;

b) an interior cutout provided in a radial interior of each connecting portion to define a bending position of each connecting portion; and c) a receptacle provided in a radial exterior of each segment core piece to receive an expanded part formed in the thickness direction at the time of bending each connecting portion.

The outer peripheral area is a small area located from the outermost part of each segment core piece to the radial inside of the outermost part, for example, a range from one-thirtieth to one-fifth of the maximum radial width of each segment core piece with the outer circumference of each segment core piece as a standard point.

Due to the laminated core according to the present invention, formation of gaps between the laminated core pieces caused by expanded parts of the thickness direction can be prevented. The prevention of the gaps allows the segment core pieces to be closely laminated with each other, thereby resulting in improved magnetic efficiency and high efficiency in the device. Additionally, as the segment core pieces can be closely laminated without gaps, vibrations and noise during operation of the device can be reduced.

Furthermore, because the circularity and height of the resultant laminated core are made in accordance with its dimensions, the quality control of the laminated core becomes easy and motor quality is improved.

In the laminated core according to the present invention, the receptacle may be a cutout or a through-hole formed in each segment core piece. Alternatively, the receptacle may be formed by a first hollow and a second hollow respectively provided on a front side and a back side of each segment core piece with central axes of the hollows aligned. In the case of the receptacle formed by the first and second hollows, each of the hollows preferably has a shape of one of a circular cone, a circular truncated cone, a pyramid, a truncated pyramid, a circular cylinder, and a prism. The first hollow and the second hollow in the shape of a circular truncated cone or a four-sided pyramid are particularly advantageous in that formation of the hollows is easy and blades are not worn easily.

In the case of the receptacle formed by the first and second hollows, each of the hollows may have a depth within the range of 0.15-0.4 times the thickness of the segment core piece (generally, 0.15-0.5 mm). Such receptacle is capable of receiving the expanded part of the thickness direction formed in each connecting portion at the time of bending each connecting portion. Thus, the laminated core having a uniform height is formed.

Additionally, in the case of the receptacle formed by the first and second hollows, it is further preferable that a through-hole is provided in central positions of the first hollow and the second hollow to communicate with the first hollow and the second hollow. Therefore, excess metal generated by pressing the hollows is moved toward the through-hole, and the projections formed by the excess metal (i.e. metal which has escaped from the hollows by press working) are not generated on the surface of the segment core pieces. Accordingly, it is preferable that the volume of the through-hole is equal to or larger than the total volume of the first and second hollows.

In the laminated core according to the present invention, it is preferable that an engaging part comprising a concave part and a convex part to be engaged with the concave part is formed at the side edges of the adjacent segment core pieces. Thus, the adjacent segment core pieces connected only by the radially-narrow connecting portion are positioned by the engaging part comprising the concave and convex parts, and a radial position and a bending angle of the adjacent segment core pieces are determined. As a result, the circular degree, i.e., the roundness of the bent segment core pieces is improved. As herein used, the concave and convex parts are preferably semicircles or sectors (arc-shaped) having a center angle of 50 degree or more and less than 180 degree, but the shape thereof is not necessarily limited thereto.

To accomplish the above mentioned object, the present invention provides a method for manufacturing a laminated core formed with multiple continuous segment core pieces wound in a spiral form by bending connecting portions mutually connecting the adjacent segment core pieces, the connecting portions being formed in an outer peripheral area of the laminated core, while the connecting portions of vertically adjacent layers being displaced in a circumferential direction with inner edges or outer edges of the segment core pieces fitted, the method comprising:

at the time of forming the segment core pieces, a step A of forming a concave cutout in a radial exterior of each connecting portion to dispose a radially expanded portion within an outer circle of the laminated core, the radially expanded portion being formed with each connecting portion expanding radially outward at the time of bending each connecting portion;

a step B of forming an interior cutout in a radial interior of each connecting portion to define a bending position of each connecting portion; and a step C of forming a receptacle in a radial exterior of each segment core piece to receive an expanded part of the thickness direction formed in the thickness direction at the time of bending each connecting portion.

In the method for manufacturing a laminated core according to the present invention, the steps A, B, and C may be performed either in a different order or simultaneously.

Additionally, the specific shape of the receptacle is a cutout, through-hole, or hollow;

however, a detailed description thereof is omitted because the receptacle has the same shape as that of the laminated core described above. In the case of the receptacle formed by the first and second hollows with the through-hole in the center, it is preferable that the through-hole is formed first and then the first and second hollows are punched. Due to the process, the excess metal generated during the hollowing process is moved to the through-hole, and thus the projections are not formed in the segment core pieces.

The method for manufacturing the laminated core according to the present invention is capable of further improving the circular accuracy of the multiple segment core pieces by winding and laminating the band of connected segment core pieces.

Furthermore, the side edges of the adjacent segment core pieces may be closely placed with a slight gap therebetween. In this case, since contacts between the side edges of the segment core pieces are prevented, uneven pitches of the segment core pieces in the circumferential direction can be prevented by adjustment of the gap. For example, displacement of caulking positions of the segment core pieces in the laminating direction can be prevented. Additionally, due to the closely positioned side edges of the adjacent segment core pieces, for example, even if the molding blades for punching the segment core pieces are worn away and burrs are formed, the contacts between the burrs can be prevented. Thus, misalignment of pitches of the segment core pieces in the circumferential direction can be prevented.

BRIEF DESCRIPTION OF DRAWINGS

FIG. 5(A)-FIG. 5(J) are descriptive illustrations of receptacles according to other embodiments.

BEST MODE FOR CARRYING OUT THE INVENTION

Figure 1:
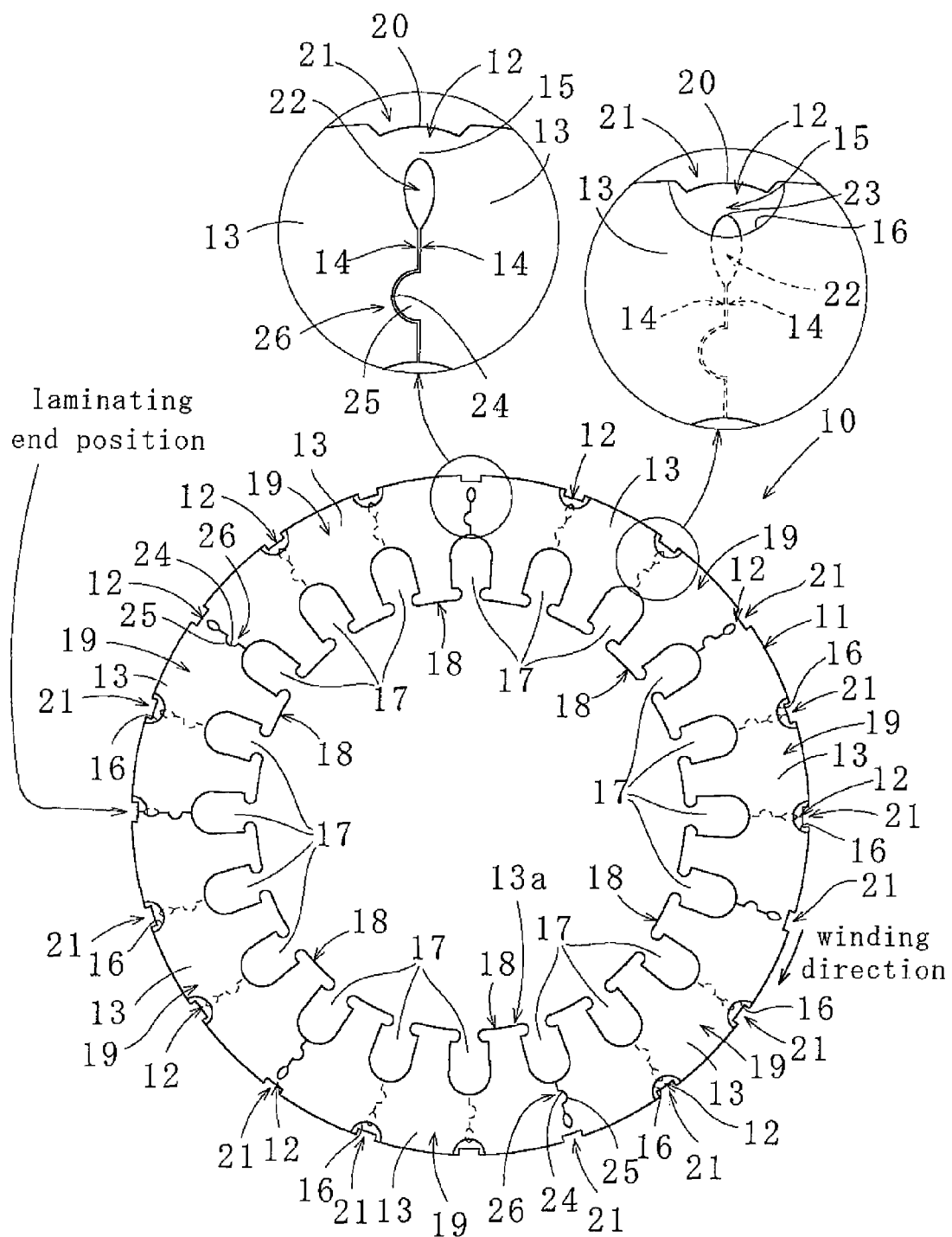
FIG. 1 is a plain view of a laminated core according to a first embodiment of the present invention.
Figure 2:
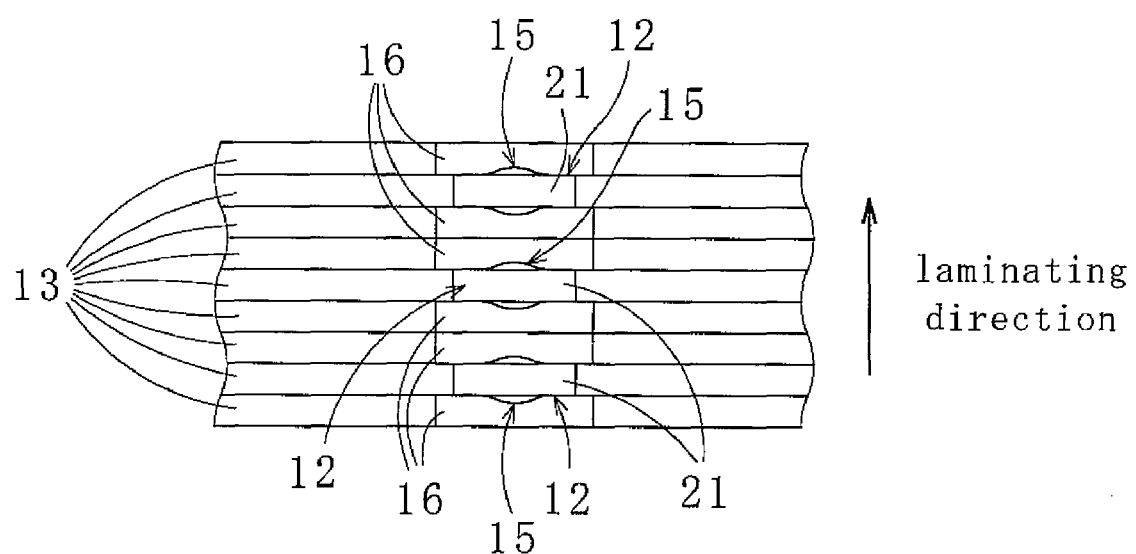
FIG. 2 is a partial side view of the laminated core.
Figure 3:
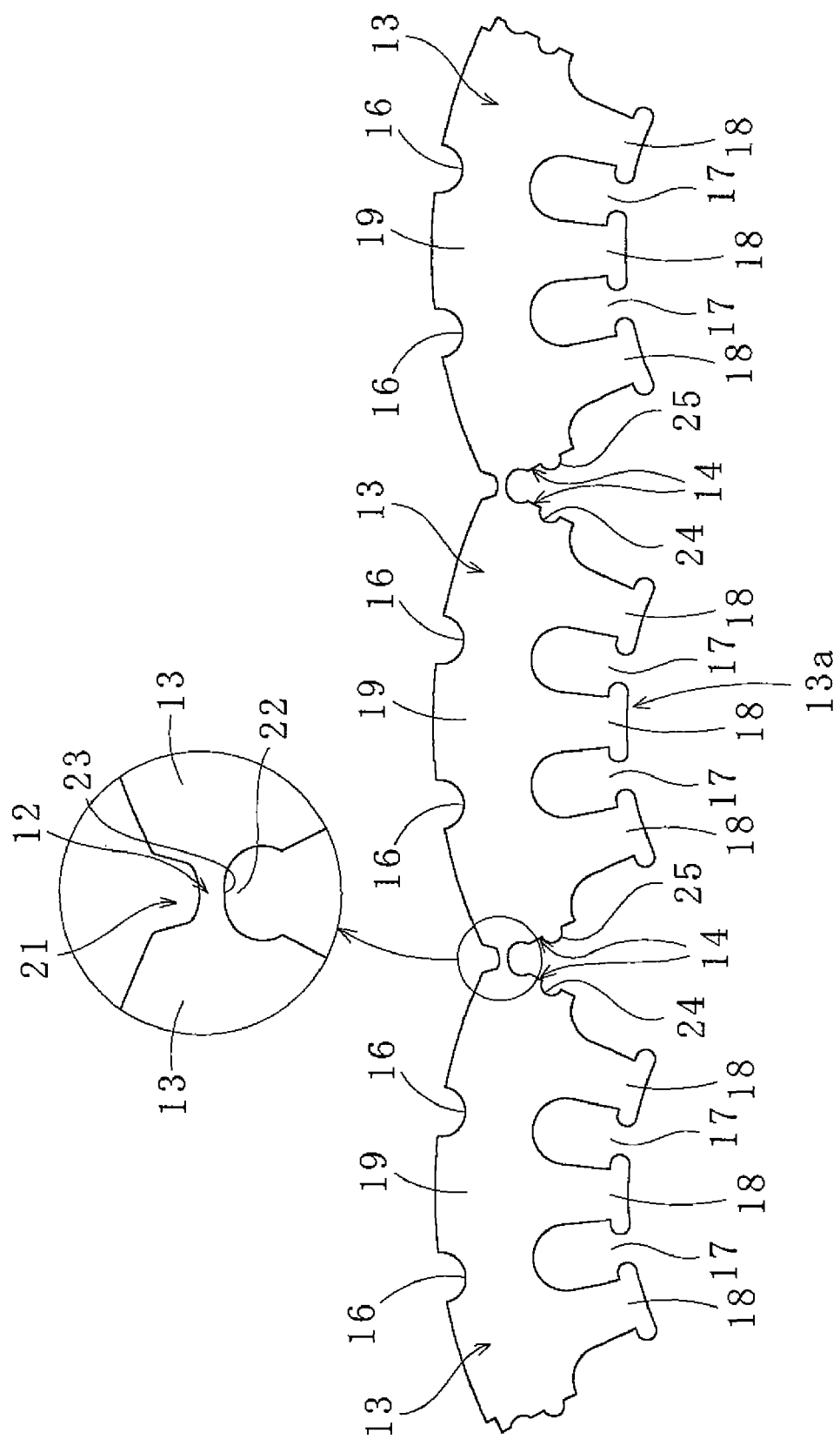
FIG. 3 is a partial plain view illustrating segment core pieces of the laminated core before being laminated.

As illustrated in FIGS. 1-3, a laminated core 10 according to a first embodiment of the present invention is laminated with multiple continuous segment core pieces 13 wound in a spiral form by bending connecting portions 12 of a continuous segment member formed with the adjacent segment core pieces 13 connected by the connecting portions 12 formed on an outer peripheral area 11, with inner circumferential portions 13a (or outer circumferential portions) of the segment core pieces 13 fitted. Accordingly, circumferentially adjacent side edges 14 of the adjacent segment core pieces 13 are either brought into contact with each other or closely placed with a fine gap therebetween. As used herein, to fit the inner circumferential portions 13a (or outer circumferential portions) means to dispose the inner edges (or outer edges) of the segment core pieces 13 on the same circle, or vertically align the inner edges (or outer edges) of the segment core pieces 13. The fitting of the inner circumferential portions 13a (or outer circumferential portions) allows magnetic pole sections 18 to be vertical aligned. The laminated core 10 is a stator laminated core (also referred to as "stator") made by displacing the connecting portions 12 provided in vertically adjacent layers, i.e., upper and lower segment core pieces 13 in a circumferential direction. Receptacles 16 are provided in a radial exterior of each of the segment core pieces 13 to receive an expanded part 15 formed in the thickness direction at the time of bending the connecting portion 12. The details of the above components are described below.

The laminated core 10 is made by punching the multiple segment core pieces 13 linked by the connecting portions 12 by using a mold from a magnetic steel strip (not illustrated) having a thickness of, e.g., about 0.15-0.5 mm, winding the series of the punched segment core pieces 13, and sequentially laminating and caulking the segment core pieces 13 as illustrated in FIGS. 1, 2. To couple the laminated segment core pieces, one, or two or more of caulking (half-blanking caulking, V-shaped caulking, etc.), welding, and bonding can be employed.

Each of the segment core pieces 13 has an arc-shaped yoke section 19 and a plurality of (three in the present embodiment) the pole sections 18 formed in the inner portion thereof, and slots 17 are provided between the pole sections 18.

Each of the connecting portions 12 is provided between the adjacent segment core pieces 13 in order to connect the segment core pieces 13 in the outer peripheral area 11, i.e., a position which is slightly radially inward of the circumference of the segment core pieces 13. A concave cutout 21 is provided radially outward of each of the connecting portions 12 to dispose a radially expanded part 20 within the outer circumference of the laminated core 10. The radially expanded part 20 is formed with the connecting portion 12 expanded radially outward upon curving the connecting portion 12. Thus, as illustrated in FIG. 3, the radially outward portions of the connecting portions 12 are concave radially inward before the connecting portions 12 are bent.

Additionally, an interior cutout 22 is provided radially inward of each of the connecting portions 12 (radially outward of the side edges 14) as illustrated in FIGS. 1, 3. The interior cutouts 22 are arc shaped before the connecting portions 12 are bent. A bending point is formed at the innermost 23 of each of the interior cutouts 22. The shape of the interior cutout before being bent may be, for example, an inverted-U shape or an inverted-V shape when viewed from the top thereof.

The interior cutout 22 is to be a substantially oval shape after the connecting portion 12 is bent and forms a gap between the adjacent core pieces 13. Thus, the interior cutout 22 prevents the contact between radially external peripheries of the side edges 14 at the time of engaging radially internal peripheries of the side edges 14 of the adjacent segment core pieces 13.

At the time of winding and laminating the segment core pieces 13 connected by the connecting portions 12 as illustrated in FIGS. 1, 2, the connecting portions 12 provided between the circumferentially adjacent segment core pieces 13 are displaced in the circumferential direction between vertically adjacent layers (segment core pieces 13), whereas the positions of the pole sections 18 are aligned. In this embodiment, the connecting portions 12 are displaced in the circumferential direction for one slot when the segment core pieces 13 are laminated. Alternatively, the connecting portions 12 may be displaced for more than one slot.

If the total number of the slots per circle of the laminated core when viewed from the top thereof is "m," the number of the slots (the same as the number of the pole sections) per segment core piece is "n," and the number of the segment core pieces per circle necessary to displace one slot in the laminating direction is "k", the following relation is established:

$$(m+1)/n=k$$

wherein "m," "n," and "k" are positive integers, and variable depending on the manufacturing conditions of the laminated core.

In this embodiment, the total number of the slots per circle of the laminated core when viewed from the top thereof is 20 (m=20), and the number of the pole sections per segment core piece is 3 (equivalent to the number of the slots: n=3) as illustrated in FIG. 1. Calculated from the above formula, the number of the segment core pieces necessary for one circuit is 7 (k=7). Thus, only one pole section of the seventh segment core piece is to be a part of the next layer at the time of laminating, and the positions of the connecting portions in the circumferential direction when viewed from the top thereof are displaced by one pole section (equivalent to one slot).

Additionally, if the number of the slots displaced in the laminating direction is two or more, the number of the segment core pieces necessary for one circuit is calculated by replacing "1" in the above formula by the number of the core pieces to be shifted, i.e., 2 or more.

As the positions of the connecting portions 12 of vertically adjacent segment core pieces 13 are shifted in the circumferential direction when the plurality of the segment core pieces 13 are wound and laminated, coupling strength for each segment core piece 13 is enhanced.

Because the positions of the connecting portions 12 are displaced between vertically adjacent segment core pieces 13 as described above, the segment core pieces 13 and connecting portions 12 are positioned side by side in the laminating direction. The receptacles 16 are provided in the radially outside of each segment core piece 13 at substantially the same angle position (herein, a position where center lines of the slot 17 and receptacle 16 are aligned) as that of the connecting portions 12. As a result, the expanded parts 15 formed in the thickness direction by bending the connecting portions 12 are disposed in the receptacles 16 of the segment core pieces 13 adjacent in the laminating direction. Each of the receptacles 16 is a cutout in the shape of a semicircle; however, the shape thereof is not limited thereto as long as it can receive the expanded part 15 of the thickness direction. For example, the shape of the receptacle may be oval or oblong (square or rectangle). Additionally, the size of the receptacle is not limited as long as it can surround at least the expanded part 15 of the thickness direction formed in the connecting portion 12. In this embodiment, each of the receptacles 16 is in a size that exposes a part (the radial exterior) of the interior cutout 22 of the segment core piece 13 located downward in the laminating direction. The receptacle may be a throughhole.

According to the configuration described above, the interior cutouts 22 provided in the connecting portions 12 gives a favorable hinging effect to the connecting portions 12 at the time of bending the connecting portion 12.

Because the outer periphery of each of the connecting portions 12 is stretched in the circumferential direction upon arching each of the connecting portions 12, and the outer periphery becomes thinner and a radially expanded part 20 is formed radially outward. However, the radially expanded part 20 is positioned within the concave cutout 21, thereby causing no problems. Meanwhile, the interior periphery of each of the connecting portions 12 is pushed and shrunk in the circumferential direction, and thus the expanded part 15 is formed in the thickness direction. However, the expanded part 15 is positioned within the vertically adjacent receptacles 16, thereby causing no problems.

An engaging section 26 including a concave part 24 and a convex part 25 to be engaged therewith is provided in radially inward areas of the side edges 14 of the adjacent segment core pieces 13. In the present embodiment, the side edges 14 of the adjacent segment core pieces 13, which include the concave and convex parts 24, 25, are closely placed with a fine gap therebetween. Alternatively, the concave and convex parts 24, 25 may be in contact with each other. In the present embodiment, the concave and convex parts 24, 25 have the same semicircular shapes when viewed from the top thereof, and thereby mutual positioning of the adjacent segment core pieces 13 are done more accurately and accuracy of the annular shape is improved.

A method for manufacturing a laminated core according to one embodiment of the present invention is now described.

First, the multiple segment core pieces 13 connected mutually at the connecting portions 12 are punched using one or more molds (not illustrated) as illustrated in FIG. 3, while the magnetic steel strip (not illustrated) is conveyed.

To punch the segment core pieces 13, generally, a step A of forming the concave cutout 21, a step B of forming the interior cutout 22, and a step C of forming the receptacles 16 are performed after the slots 17 are punched. Depending on the shape of the mold, the steps A-C may be performed simultaneously, individually in sequence, in a different order, or simultaneously with punching of the slots 17.

Then, the connecting portion 12 is bent with the innermost 23 of the interior cutout 22 as a bending start point, and the convex part 25 is engaged with the concave part 24 of the adjacent segment core piece 13. At the same time, the multiple linked segment core pieces 13 are spirally wound and laminated while the inner circumferential portions 13a of the segment core pieces 13 are fitted and the connecting portions 12 of the vertically adjacent segment core pieces 13 are displaced in the circumferential direction. In this manner, the laminated core 10 is produced.

In the receptacles 16 formed in the radial exteriors of the segment core pieces 13, the expanded parts 15 of the connecting portions 12 that are vertically adjacent to the receptacles 16 are positioned, and the expanded parts 15 of the thickness direction can be fitted in the thickness of the segment core pieces 13. As a result, occurrence of gaps between the segment core pieces adjacent in the laminating direction can be prevented.

Figure 4:
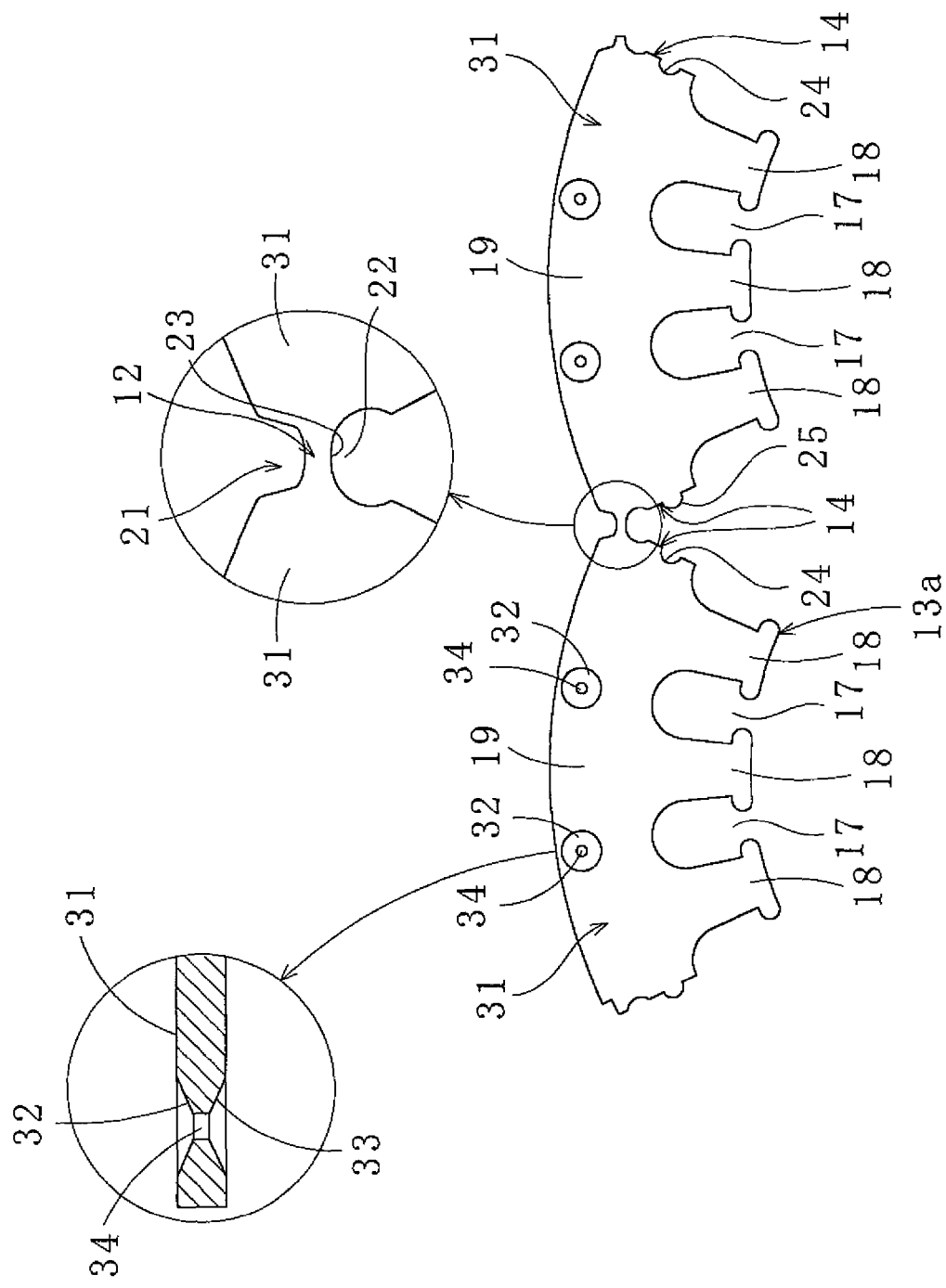
FIG. 4 is a descriptive illustration of a laminated core according to a second embodiment of the present invention.

Referring now to FIG. 4, a laminated core 30 (see FIG. 1) according to a second embodiment of the present invention is described. The same components as those of the laminated core 10 according to the first embodiment are provided with the same numbers, and a detailed description thereof is omitted.

In the laminated core 30, receptacles to receive the expanded parts 15 in the thickness direction (see FIGS. 1, 2) produced by bending segment core pieces 31 are formed with first and second hollows 32, 33 (see FIG. 4). The first and second hollows 32, 33 are provided at prescribed positions on front and back sides of the segment core pieces 31. The first and second hollows 32, 33 are formed on a center line of each of the U-shaped slots 17 formed between the adjacent pole sections 18 and in the same radial position as that of the connecting portion 12.

The first and second hollows 32, 33 are circular truncated cones, and have a through-hole 34 in the center. Preferably, the first and second hollows 32, 33 are punched after the through-hole 34 is formed. The first and second hollows 32, 33 have, for example, an external diameter within the range of 2-5 times the minimum radial width of the connecting portion 12 and a depth within the range of 0.15-0.4 times the thickness of the segment core piece 31. Additionally, the total volume of the first and second hollows 32, 33 is preferably within the range of 0.8-1.5 times the volume of the through-hole 34. The present invention is applicable to the case where the magnification ratio of the total volume is less than 0.8 or more than 1.5.

Furthermore, by providing the receptacles, each formed by the first and second hollows 32, 33 and the through-hole 34, at the prescribed positions of the segment core pieces 31, the expanded parts 15 of the thickness direction produced by bending the connecting portions 12 can be received in the first and second hollows 32, 33.

Providing the receptacles leads to a uniform height of the laminated core 30, improved accuracy of product dimensions, and prevention of vibration and noise at the point of use.

Other embodiments of receptacles are illustrated in FIG. 5(A)-FIG. 5(J). FIG. 5(A)-FIG. 5(E) illustrate receptacles 40-44 without through-holes in the centers. The hollows provided on front and back sides of FIG. 5(A)-FIG. 5(E) have a circular cone shape, a pyramid shape, a short cylinder shape, a short prism shape, and a hemisphere shape, respectively. The receptacles 45-49 illustrated in FIG. 5(F)-FIG. 5(J) are provided with through-holes in the centers. The hollows in FIG. 5(F)-FIG. 5(J) have a truncated six-sided pyramid shape, a truncated four-sided pyramid shape, a short circular cylinder shape, a short prism shape, and a hemisphere shape.

In any of the cases, it is preferable that the depth of hollows for the receptacles is equal to or deeper than the expanded part 15 of the thickness direction formed by bending the connecting portion 12.

The present invention has been described with reference to the above-mentioned embodiments, but the present invention is not limited to the structures described in the above embodiments, and includes other embodiments and modified embodiments made without departing form the spirit and scope of the present invention. For example, a laminated core and a method for manufacturing the same are configured by combining a part or all of the embodiments and modified embodiments mentioned above fall within the rights of the present invention.

In the embodiments, a case in which the laminated core is a stator laminated core has been described, but the present invention is apparently applicable to the case of a rotator laminated core (also referred to as a "rotor").

INDUSTRIAL APPLICABILITY

In the laminated core and method for manufacturing the same according to the present invention, the concave cutout and interior cutout are respectively provided on the radial exterior and radial interior of each of the connecting portions of the adjacent segment core pieces, and the receptacles are provided on the radial exterior of each of the segment core pieces to receive the expanded parts of the thickness direction formed in the connecting portions upon winding the segment core pieces. Thus, the laminated core that is uniform in the height direction and has high dimension accuracy is provided.

Furthermore, the laminated core is a wound core produced by spirally winding the segment core pieces connected by the connecting portions. Thus, the core material is used highly efficiently, and inexpensive laminated core (rotor or stator) can be obtained.

The invention claimed is:

1. A laminated core formed with multiple continuous segment core pieces wound in a spiral form by bending connecting portions mutually connecting the adjacent segment core pieces, the connecting portions being formed in an outer peripheral area of the laminated core, while the connecting portions of vertically adjacent layers being displaced in a circumferential direction with inner edges or outer edges of the segment core pieces fitted, the laminated core comprising:
   a) a concave cutout provided in a radial exterior of each connecting portion to dispose a radially expanded portion within an outer circle of the laminated core, the radially expanded portion being formed with each connecting portion expanding radially outward at the time of bending each connecting portion;
   b) an interior cutout provided in a radial interior of each connecting portion to define a bending position of each connecting portion; and
   c) a receptacle provided in a radial exterior of each segment core piece to receive an expanded part formed in the thickness direction at the time of bending each connecting portion.

2. The laminated core as defined in claim 1, wherein the receptacle is a cutout formed in each segment core piece.

3. The laminated core as defined in claim 1, wherein the receptacle is a through-hole formed in each segment core piece.

4. The laminated core as defined in claim 1, wherein the receptacle is formed by first and second hollows respectively provided on front and back sides of each segment core piece.

5. The laminated core as defined in claim 4, wherein each of the hollows has a shape of one of a circular cone, a circular truncated cone, a pyramid, a truncated pyramid, a circular cylinder, and a prism.

6. The laminated core as defined in claim 4, wherein each of the hollows has a depth within the range of 0.15-0.4 times the thickness of the segment core piece.

7. The laminated core as defined in claim 4, wherein a through-hole is provided in central positions of the first and second hollows to communicate with the first and second hollows.

8. The laminated core as defined in claim 1, wherein an engaging part comprising a concave part and a convex part to be engaged with the concave part is formed at the side edges of the adjacent segment core pieces.

9. A method for manufacturing a laminated core formed with multiple continuous segment core pieces wound in a spiral form by bending connecting portions mutually connecting the adjacent segment core pieces, the connecting portions being formed in an outer peripheral area of the laminated core, while the connecting portions of vertically adjacent layers being displaced in a circumferential direction with inner edges or outer edges of the segment core pieces fitted, the method comprising:

at the time of forming the segment core pieces, a step A of forming a concave cutout in a radial exterior of each connecting portion to dispose a radially expanded portion within an outer circle of the laminated core, the radially expanded portion being formed with each connecting portion expanding radially outward at the time of bending each connecting portion;

a step B of forming an interior cutout in a radial interior of each connecting portion to define a bending position of each connecting portion; and a step C of forming a receptacle in a radial exterior of each segment core piece to receive an expanded part formed in the thickness direction at the time of bending each connecting portion.

10. The method for manufacturing a laminated core as defined in claim 9, wherein the receptacle is a cutout formed in each segment core piece.

11. The method for manufacturing a laminated core as defined in claim 9, wherein the receptacle is a through-hole formed in each segment core piece.

12. The method for manufacturing a laminated core as defined in claim 9, wherein the receptacle is formed by first and second hollows respectively provided on front and back sides of each segment core piece.

13. The method for manufacturing a laminated core as defined in claim 12, wherein each of the hollows has a depth within the range of 0.15-0.4 times the thickness of the segment core piece.

14. The method for manufacturing a laminated core as defined in claim 12, wherein a through-hole is provided in central positions of the first and second hollows.

15. The method for manufacturing a laminated core as defined in claim 14, wherein the first and second hollows are formed by a punching process after forming of the through-hole.

16. The method for manufacturing a laminated core as defined in claim 9, wherein an engaging part comprising a concave part and a convex part to be engaged with the concave part is formed at the side edges of the adjacent segment core pieces.

* * * * *